US010448306B2

(12) United States Patent
Singh et al.

(10) Patent No.: US 10,448,306 B2
(45) Date of Patent: *Oct. 15, 2019

(54) HETNET MOBILITY MANAGEMENT (71) Applicant: Apple Inc., Cupertino, CA (US)

(72) Inventors: Ajoy Singh, Cupertino, CA (US); Tarik Tabet, Cupertino, CA (US); Wen Zhao, Cupertino, CA (US); Aon Mujtaba, Cupertino, CA (US); Christian W. Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/640,871

(22) Filed: Jul. 3, 2017

(65) Prior Publication Data

US 2017/0374598 A1 Dec. 28, 2017

Related U.S. Application Data

(63) Continuation of application No. 14/195,681, filed on Mar. 3, 2014, now Pat. No. 9,699,704.

(60) Provisional application No. 61/772,493, filed on Mar. 4, 2013.

(51) Int. Cl.
*H04W 36/32* (2009.01)
*H04W 36/00* (2009.01)

(52) U.S. Cl.
CPC ....... *H04W 36/32* (2013.01); *H04W 36/0033* (2013.01)

(58) Field of Classification Search
CPC .......................... H04W 36/32; H04W 36/0033

USPC .......................... 370/310, 328, 329, 331, 332
See application file for complete search history.

(56) References Cited

U.S. PATENT DOCUMENTS

| 2005/0287949 | A1 | 12/2005 | Harris et al. |
| 2011/0319086 | A1 | 12/2011 | Katori |
| 2013/0003577 | A1* | 1/2013 | Gupta ............... H04W 52/0225 370/252 |

(Continued)

FOREIGN PATENT DOCUMENTS

| CN | 102104920 | 6/2011 |
| EP | 2693829 | 2/2014 |

(Continued)

OTHER PUBLICATIONS

International Preliminary Report on Patentability, Application No. PCT/US2014/020037, dated Sep. 17, 2015, 11 pages.

(Continued)

*Primary Examiner* — Obaidul Huq
(74) *Attorney, Agent, or Firm* — Meyertons, Hood, Kivlin, Kowert & Goetzel, P.C.

(57) ABSTRACT

A wireless communication system is presented for robust mobility management in a HetNet communication system. A source cell can prepare a macro cell and a target small cell as handover candidates during handover decision making and/or preparation. The mobile device is informed about the prepared macro cell and target small cell using radio resource control (RRC) messaging. After receiving a handover command or detecting radio frequency (RF) loss, the mobile device can try to connect with the target small cell. If the mobile device is unable to connect to the target small cell, the UE can fall back and connect to the macro cell.

19 Claims, 9 Drawing Sheets

(56) References Cited

U.S. PATENT DOCUMENTS

| | | | | |
|---|---|---|---|---|
| 2013/0194941 A1* | 8/2013 | Lu | ................ | H04W 52/0254 370/252 |
| 2013/0210422 A1* | 8/2013 | Pani | ................ | H04W 48/16 455/423 |
| 2013/0265987 A1* | 10/2013 | Ramachandran | ................ | H04W 36/0033 370/331 |
| 2014/0044029 A1* | 2/2014 | Chou | ................ | H04W 52/0212 370/311 |

FOREIGN PATENT DOCUMENTS

| | | |
|---|---|---|
| JP | 10501392 | 2/1998 |
| JP | 2012060664 | 3/2013 |
| WO | 2008042906 | 4/2008 |
| WO | 2011039960 | 4/2011 |
| WO | 2012146276 | 11/2012 |
| WO | 2013017929 | 2/2013 |
| WO | 2013019153 | 2/2013 |
| WO | 2013025539 | 2/2013 |

OTHER PUBLICATIONS

Patent Examination Report, Australian Application No. 2014226165, dated Nov. 20, 2015, 3 pages.

3GPP TR 36.839 V2.0.0 (Aug. 2012).

Sara Landstrom, et al., "Heterogeneous networks—increasing cellular capacity", Ericsson Review, Jan. 2011.

"Designing, Operating and Optimizing Unified Heterogeneous Networks", Nokia Siemens Netv;orks, White Paper, Product code: C40I-00727-WP-20JI07-I-EN.

"LTE Mobility Enhancements", Qualcomm Incorporated, Item 12120079, Feb. 2010.

Office Action from Taiwan Patent Application No. 103107277, dated May 4, 2015, 25 pages.

PCT/US2014/020037—International Search Report—dated Aug. 25, 2014.

PCT/US2014/020037—Written Opinion of the International Searching Authority—dated Aug. 25, 2014.

Nokia Siemens Network et al: "Re-establishment issues in HetNet scenarios", 3GPP Draft; R2-124030, 3rd Generation Partnership Project (3GPP), Mobile Competence Centre; 650, Route Des Lucioles; F-0692L Sophia-Antipolis Cedex; France; vol. RAN WG2, No. Qingdao, China; Aug. 13, 2012-Aug. 17, 2012; Aug. 7, 2012 (Aug. 7, 2012), XP050665764, Retrieved from the Internet: URL: http ://www.3gpp.org/ftp/tsg_Jan/WG2_RL2ffSGR2_ 79/Docs/ [retrieved on Aug. 7, 2012) paragraph (0003].

Qualcomm Europe: "Further evaluation of mobility performance in LTE", 3GPP Draft—RI-091446 Further Evaluations of Mobility Performance in LTE, 3rd Generation Partnership Project (3GPP), Mobile Competence Centre ; 650, Route Des Lucioles; F-06921 Sophia-Antipolis edex; France, vol. RAN WG I, No. eoul, South Korea; Mar. 23, 2009-Mar. 27, 2009, Mar. 28, 2009 (Mar. 28, 2009), XP050597371, pasagrapb (03.2].

Taiwan Rejection Decision, Application No. 103107277, dated Dec. 28, 2015, 7 pages.

Office Action for Korean Patent Application No. 10-2015-7023161, dated Jul. 20, 2016, pp. 1-11.

Alcatel-Lucent, Alcatel-Lucent Shanghai Bell: "UE speed-based methods and mobility state estimation for improving the mobility performance in HetNets," 3GPP TSG-RAN WG2 meeting #77 bis, R2-121707, Jeju Island, Korea, Mar. 26-30, 2012, pp. 1-8.

Office Action for Japanese Patent Application No. 2015-561510, dated Aug. 31 , 2016, pp. 1-8.

Office Action for Korean Patent Application No. 10-2017-7019638, dated Nov. 10, 2017, pp. 1-3.

Intel Corporation, "Evaluation of RRC Signalling Overhead and State Selection During Mobility", 3GPP TSG RAN WG2 Meeting #78, R2-122841, May 21-25, 2012, pp. 1-11.

3GPP TS 36.300, V11.2.0, Jun. 2012, pp. 1-201.

Intel Corporation, "Mechanism for UE Mobility State Indication", 3GPP TSG-RAN WG2#79 R2-123966, 3GPP, Aug. 6, 2012, pp. 1 9.

New Postcom, "RRC Connection Re-establishment in HetNet", 3GPP TSG-RAN WG2#81 R2-130297, 3GPP, Jan. 18, 2013, pp. 1-4.

Qualcomm Europe, "Treselection modifications for CSG cells", 3GPP TSG-RAN WG2#64 R2-086282, 3GPP, Nov. 4, 2008, pp. 1-5.

Nokia Corporation (Email discussion rapporteur), "Summary of email discussion [77bis#25] LIE/EDDA: Assistance information", 3GPP TSG-RAN WG2#78 R2-122512, 3GPP, May 15, 2012, pp. 1-23.

LG Electronics Inc., "MSE enhancements for HetNet", 3GPP TSG-RAN WG2#78 R2-122472, 3GPP, May 15, 2012, pp. 1-6.

Alcatel-Lucent, "remaining open issues on Pcmax signalling", 3GPP TSG-RAN WG2#72 R2-106443, 3GPP, Nov. 8, 2010, pp. 1-5.

* cited by examiner

HETNET MOBILITY MANAGEMENT

PRIORITY

This application is a continuation of U.S. patent application Ser. No. 14/195,681, entitled "HetNet Mobility Management", and filed on Mar. 3, 2014, which claims the benefit of priority from U.S. Provisional Patent Application Ser. No. 61/772,493, entitled "HetNet Mobility Management" and filed on Mar. 4, 2013, which are fully incorporated herein by reference for all purposes and to the extent not inconsistent with this application.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

BACKGROUND

Field of the Application

The disclosure is directed to wireless communications and, more particularly, to HetNet mobility management in wireless communications.

Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), single-in-multiple-out (SIMO), multiple-in-signal-out (MISO), or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min \{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

With the proliferation of wireless communications, the use of multiple types of access nodes may be used across a wireless network or system. Such a network or system is referred to as a HetNet (or heterogeneous network). For example, a wireless system can include larger coverage wide area networks (macrocells, base stations, evolved Node Bs, etc.) that overlay one or more, smaller local area networks (access points, microcells, picocells, femtocells, etc.). HetNets can offer wireless coverage in an environment with a wide variety of wireless coverage zones, ranging from an open outdoor environment to office buildings, homes, underground areas, and combinations of these and others. In this way, a HetNet can be considered a network with complex interoperation between macrocell, smaller cells, and in some cases WiFi network elements used together to provide a mosaic of coverage, with mobile device handoff capability between network elements.

In general, HetNet can be deployed to address one or more concerns, two of which are listed here for illustrative purposes only. First, HetNet can help increase the coverage area of a typical, or stand-alone, cell. For example, HetNet deployment helps improve coverage in hard to reach areas within the network that cannot be easily or economically served by a macrocell deployment. Second, HetNet can help increase the capacity of a typical cell. Wireless access network traffic may not be uniformly distributed throughout a network and there are generally areas within a wireless network deployment where subscribers are concentrated in small geographical area. An existing macrocell deployment may not be able to meet the capacity need of these densely subscribed areas. Such densely subscribed areas can be known as hotspots. In order to address the capacity need of hotspots, wireless operators are considering the dense deployment of small cells to meet the capacity need. The simultaneous deployment of small cells and macrocells in hotspot leads to HetNet deployment. Even though HetNet deployment helps solve capacity problem, it can introduce mobility and interference issues, to name a few.

Therefore, what are needed are techniques to help mitigate at least some of the mobility issues introduced by HetNet deployment.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

This disclosure makes reference to various wireless communication devices, such as access point, mobile device, base station, user equipment, Node B, access terminal and eNB. The use of these and other names is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Various techniques described herein can be used for various wireless communication systems, such as Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(WiMAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (1×RTT, 1×EV-DO Re10, RevA, RevB) technology and other technologies, such as WiFi, WiMAX, WMBA and the like.

Figure 1:
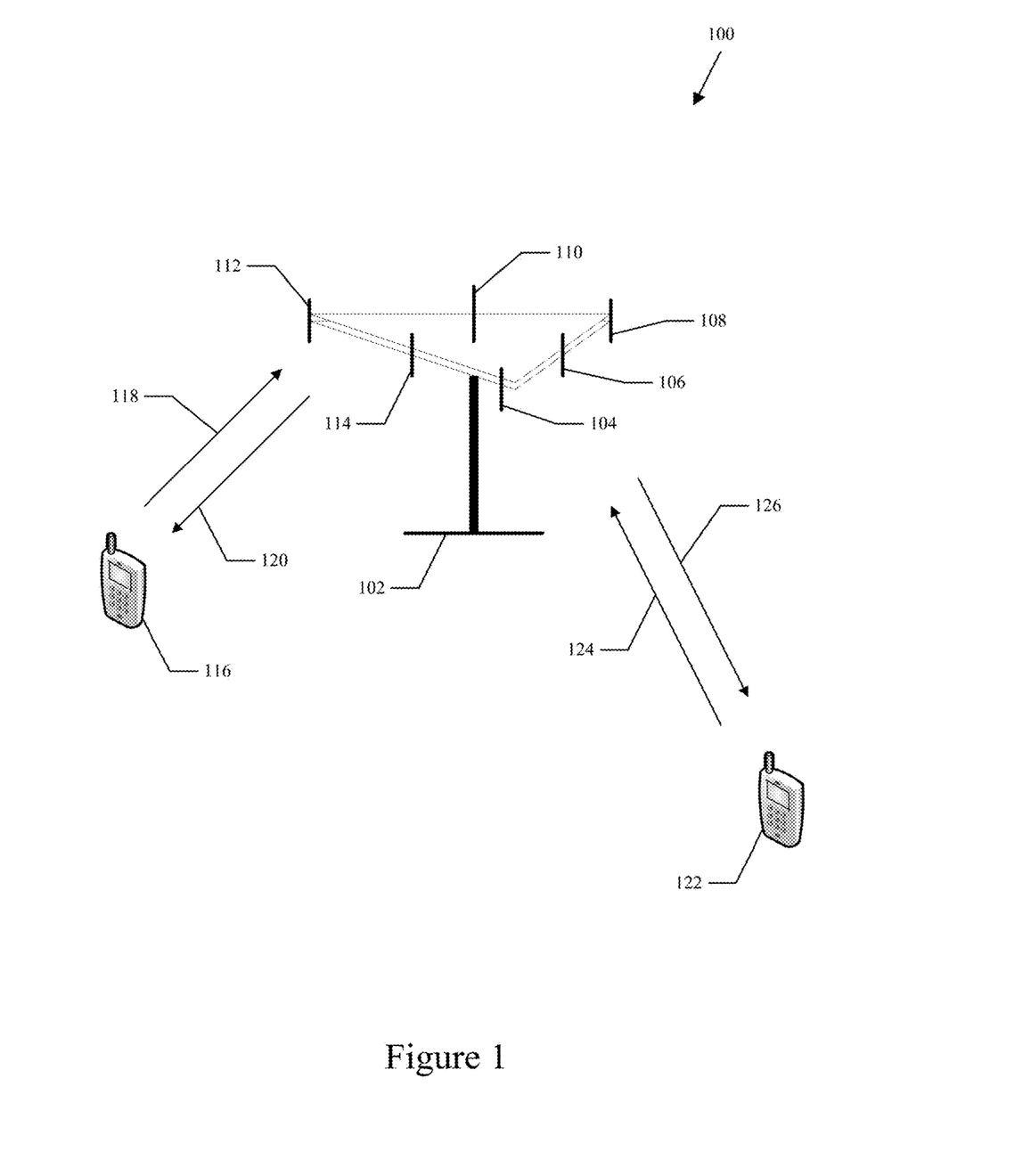
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an enhanced Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequency for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
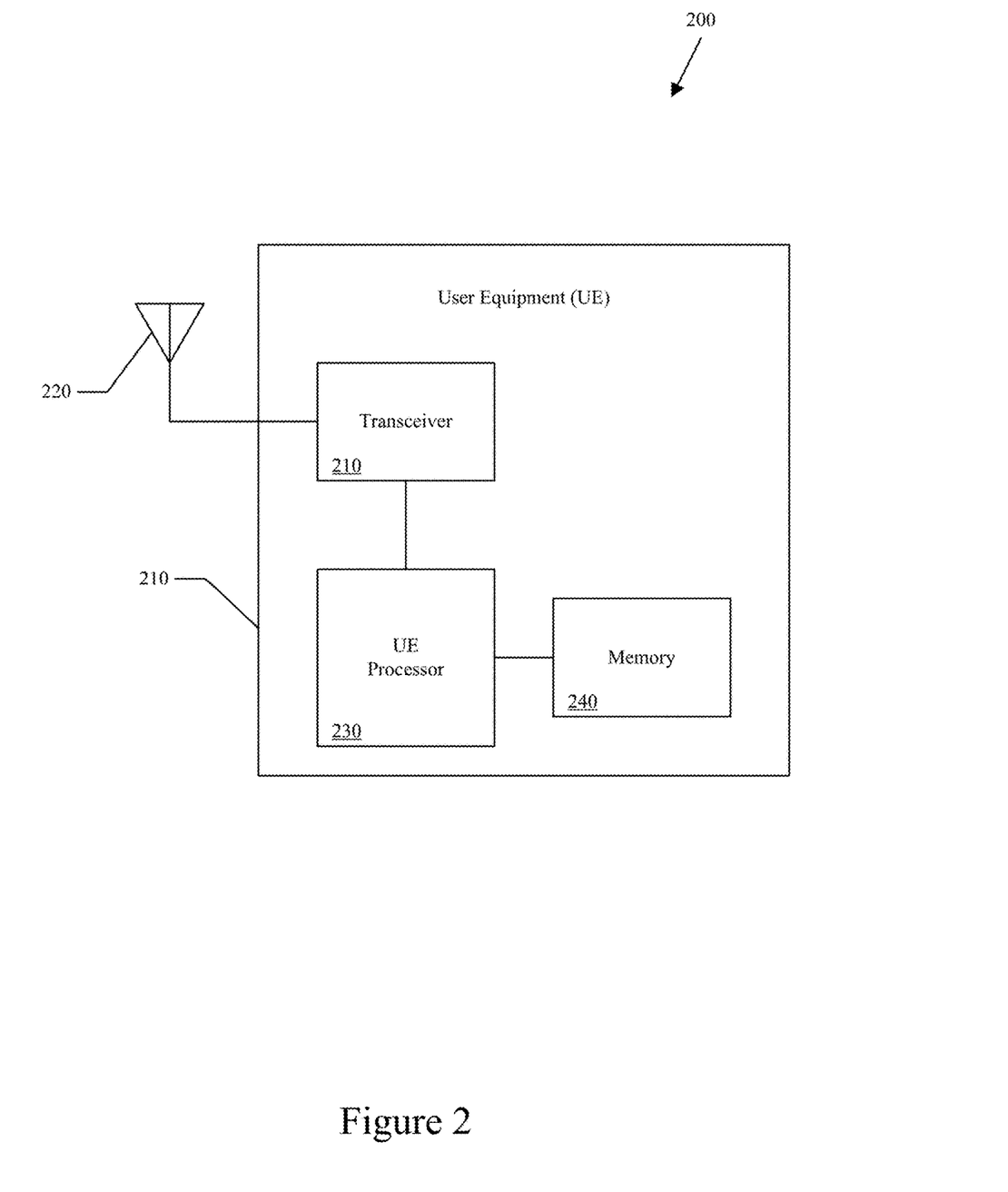
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 210, an antenna 220, a processor 230, and a memory 240 (which, in certain embodiments, may include memory in a Subscriber Identity Module (SIM) card). In certain embodiments, some or all of the functionalities described herein as being performed by mobile communication devices may be provided by processor 230 executing instructions stored on a computer-readable medium, such as the memory 240, as shown in FIG. 2. Additionally, UE 210 may perform uplink and/or downlink communication functions, as further disclosed herein, via transceiver 210 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
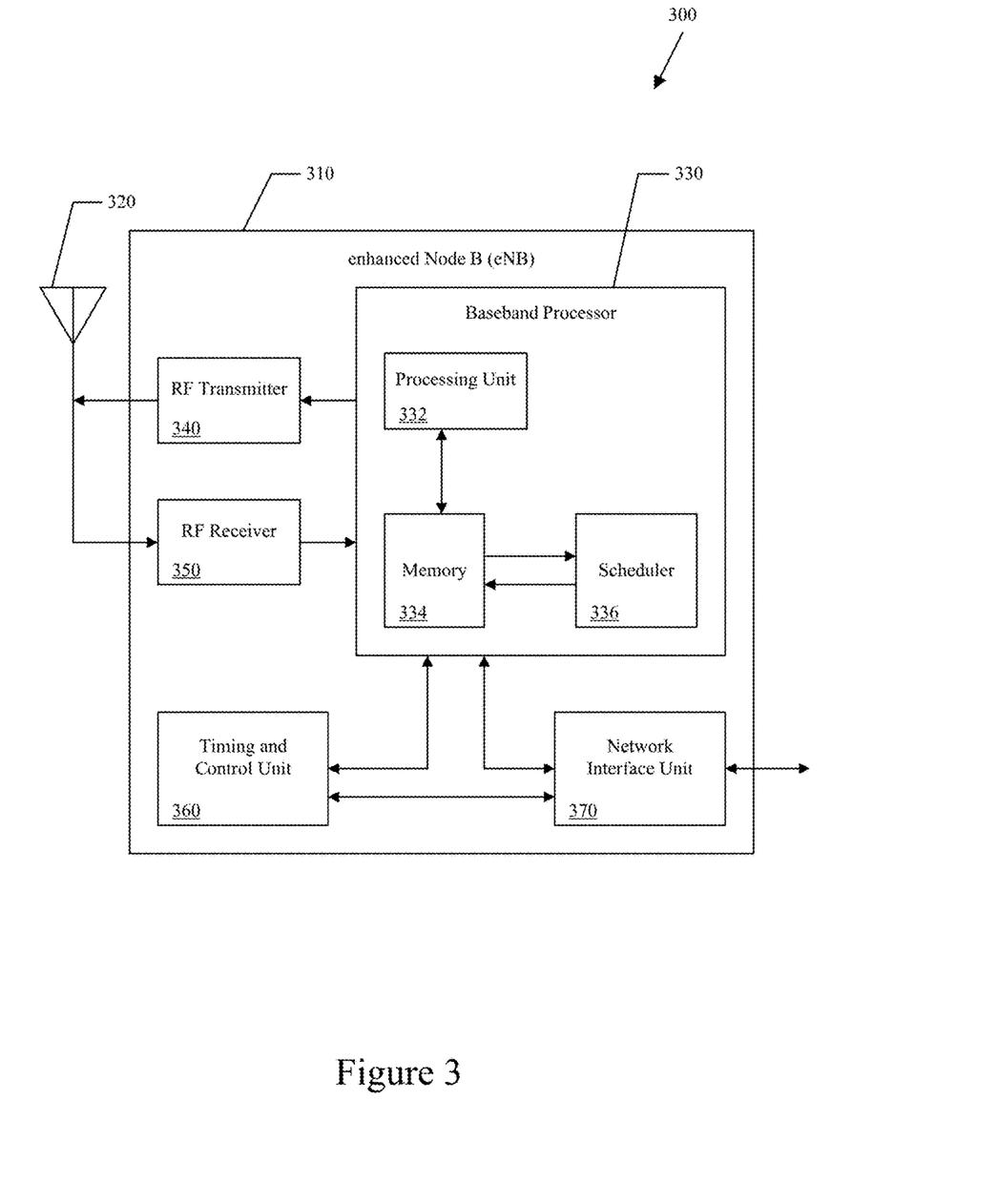
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 330 to provide radio communication with mobile handsets via a radio frequency (RF) transmitter 340 and RF receiver 350 units coupled to the eNB antenna 320. While only one antenna is shown, certain embodiments are applicable to multi-antenna configurations. RF transmitter 340 and RF receiver 330 may be combined into one, transceiver unit, or duplicated to facilitate multiple antenna connections. Baseband processor 330 may be configured (in hardware and/or software) to function according to a wireless communications standard, such as 3GPP LTE. Baseband processor 330 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e. g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

Figure 4:
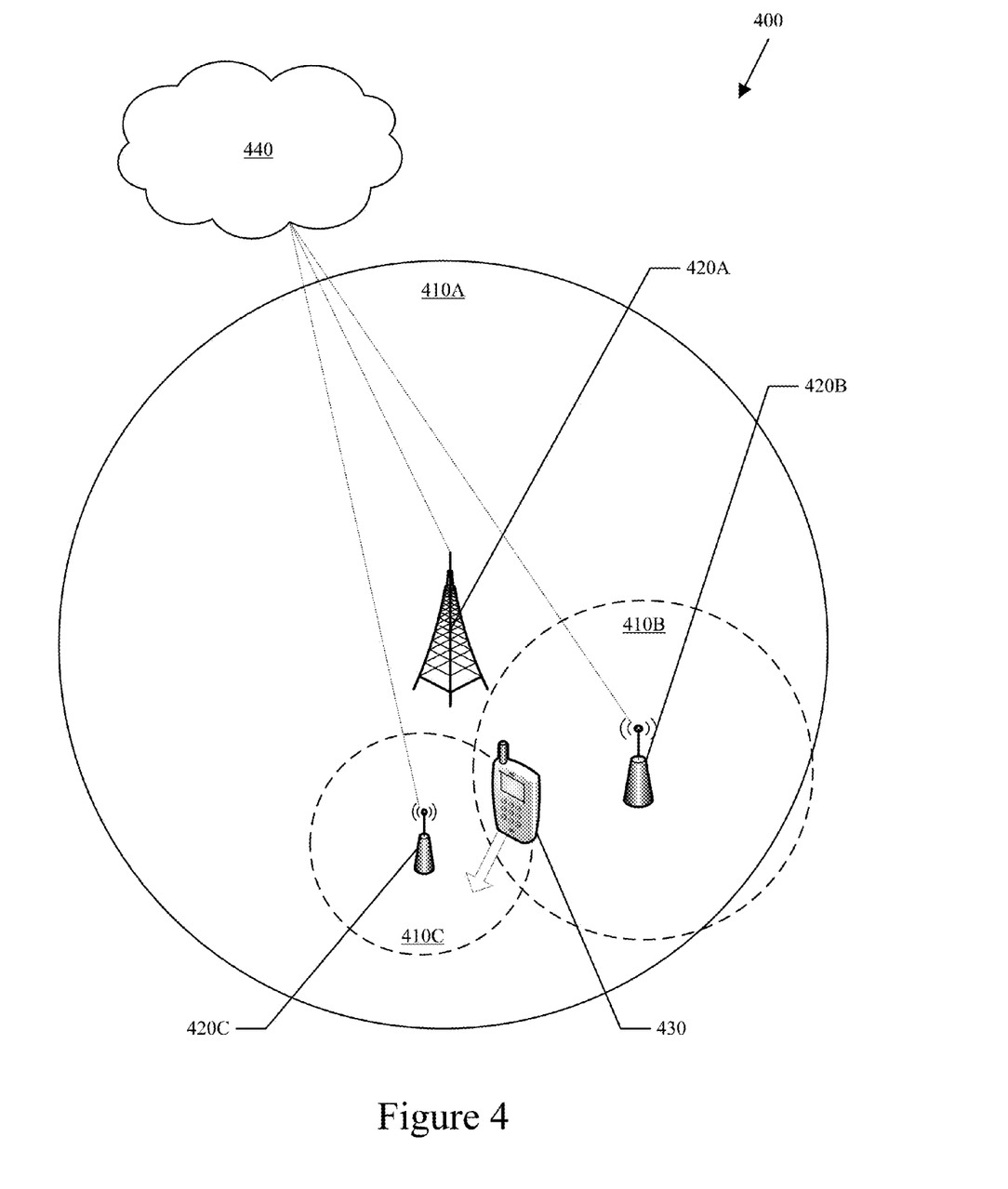
FIG. 4 illustrates an exemplary wireless HetNet configuration according to certain embodiments.

FIG. 4 illustrates an exemplary wireless HetNet configuration 400 according to certain embodiments. As shown in FIG. 4, a mobile device (handset, UE, laptop, tablet, etc.) 430 is within the coverage area of HetNet 400. HetNet 400 can include multiple network coverage pieces. For example, the largest coverage area can be a macrocell (eNB, base station, etc.) 410A. Within (or partially within) macrocell 410A coverage area, there can concurrently exist one or more sub-cell or small cell coverage areas. As shown, small cells 410B, 410C are within (or partially within) macrocell 410A and at least partially overlap each other. Each cell 410 can also include some sort of network access device 420A, 420B and 420C, such as a base station or access point. Each network access device 420 can communicate with one or more mobile devices 430, as well as with a core network 440. Not shown are possible intermediate network components or system elements that may be between a network access device 420 and the core network 440. In certain embodiments applicable to this application, mobile device 430 can be moving within macrocell 410A and moving out of small cell 410B coverage area and into small cell 410C coverage area. In this way, the mobile device 430 could possibly communicate with all three cells: macrocell 410A small cell 410B and/or small cell 410C.

In certain embodiments, a HetNet system can include many small cells overlapping, or within, a macrocell. Mobile devices, such as user equipment (UE), within the range of a small cell inside a HetNet are typically able to communicate with both the overlay macrocell and a nearby small cell. In HetNet, when a UE is connected to a small cell and is moving fast or in discontinuous reception (DRX) mode, it may find itself at the edge of the connected cell and it may not have enough time to perform active mode handover to the target small cell. In such a case, the active mode handover may fail and the UE can experience radio link failure (RLF). Upon detecting radio link failure, the UE attempt to recover from it by performing radio resource control (RRC) reestablishment procedure.

In LTE, DRX mode can be enabled in both RRC_IDLE and RRC_CONNECTED states. In the RRC_IDLE state, the UE is registered with the evolved packet system (EPS) mobility management (EMM) but does not have an active session. In this state, the UE can be paged for downlink (DL) traffic. The UE can also initiate uplink (UL) traffic by requesting RRC connection with the serving eNB. In LTE, DRX mode can also be enabled in RRC_CONNECTED state. In the RRC_CONNECTED state, DRX mode is enabled during the idle periods during the packet arrival process. When there are no outstanding/new packets to be transmitted/received, the eNB/UE may initiate the DRX mode.

However, it is likely that a UE can end up on a cell that does not have a prepared UE context, because typical small cells are single sector in nature. This is in contrast to a mobile device moving between sectors of a multi-sector macrocell, where the controller of the macrocell can maintain eNodeB specific RRC states for the UE. So, in a macrocell, even though the UE moves from one sector to another sector, the eNodeB uses the same RRC state for the UE from one sector to the next. In such scenarios, RRC reestablishment can fail and the UE will be required to perform an attach or service request procedure to recover from the radio frequency (RF) loss. The attach or service request procedure can adversely impact the performance of the UE.

Figure 5:
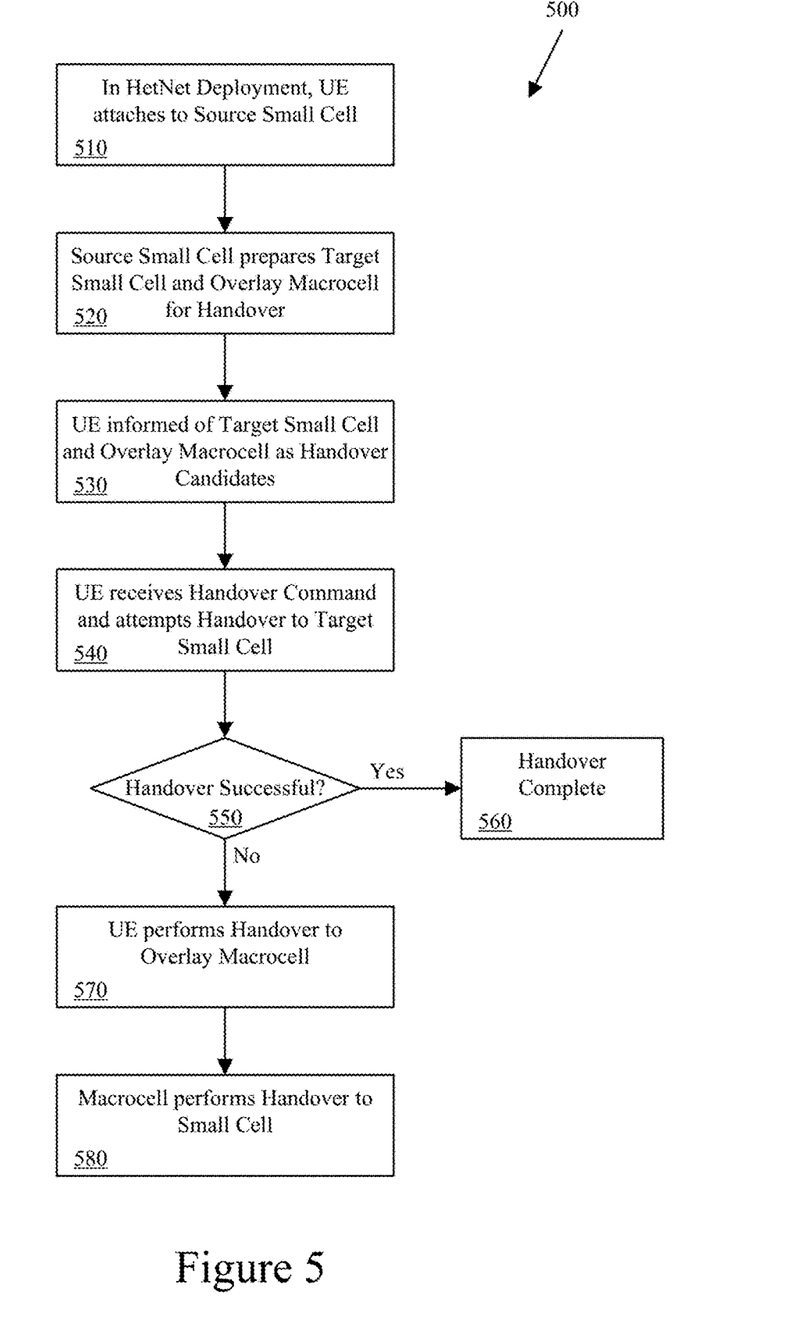
FIG. 5 illustrates an exemplary modified HetNet handover flow according to certain embodiments.

FIG. 5 illustrates an exemplary modified HetNet handover flow 500 according to certain embodiments. In HetNet deployment, assuming a small cell is the serving or source cell for the mobile device 510 and that the UE is moving from one small cell to another small cell (and both of which are within the coverage area of a macrocell), the source cell will prepare both a target small cell as well as the macrocell during handover preparation phase 520. This preparation phase can be accomplished at handover or long before handover (i.e., can be "infinite"), so that it does not have to be accomplished at handover. For example, in LTE, the source cell can inform the UE of the target small cell and that the macrocell is using system information blocks (SIBs) 4 and/or 5, which can provide neighbor information and RRC messages 530.

Upon receiving a handover command from source cell, the UE can first attempt to perform handover on the target small cell 540. If successful 550, then the handover is complete 560. If unsuccessful, 550, then the UE can fall back to the macrocell and perform handover with the macrocell 570. Upon detecting RF loss, UE can attempt to perform RRC reestablishment procedure with the macrocell. Upon successful handover or re-establishment with the macrocell, the macrocell can offload the UE to the nearby small cell to avoid overloading the macrocell 580.

In summary, a UE can perform the following in an attempt to improve handover success rate for the UE in a HetNet deployment. The source eNB can prepare macro eNodeB in addition to a target small cell as handover candidates during handover decision making. The UE is informed about the target small cell and eNodeB using RRC messaging. After receiving handover command or detecting RF loss, the UE can try to connect with the target small cell. If UE is unable to connect to the target small cell, the UE will connect to the macro eNodeB. The eNodeB on which the UE will connect can inform MME using S1 messaging.

Figure 6:
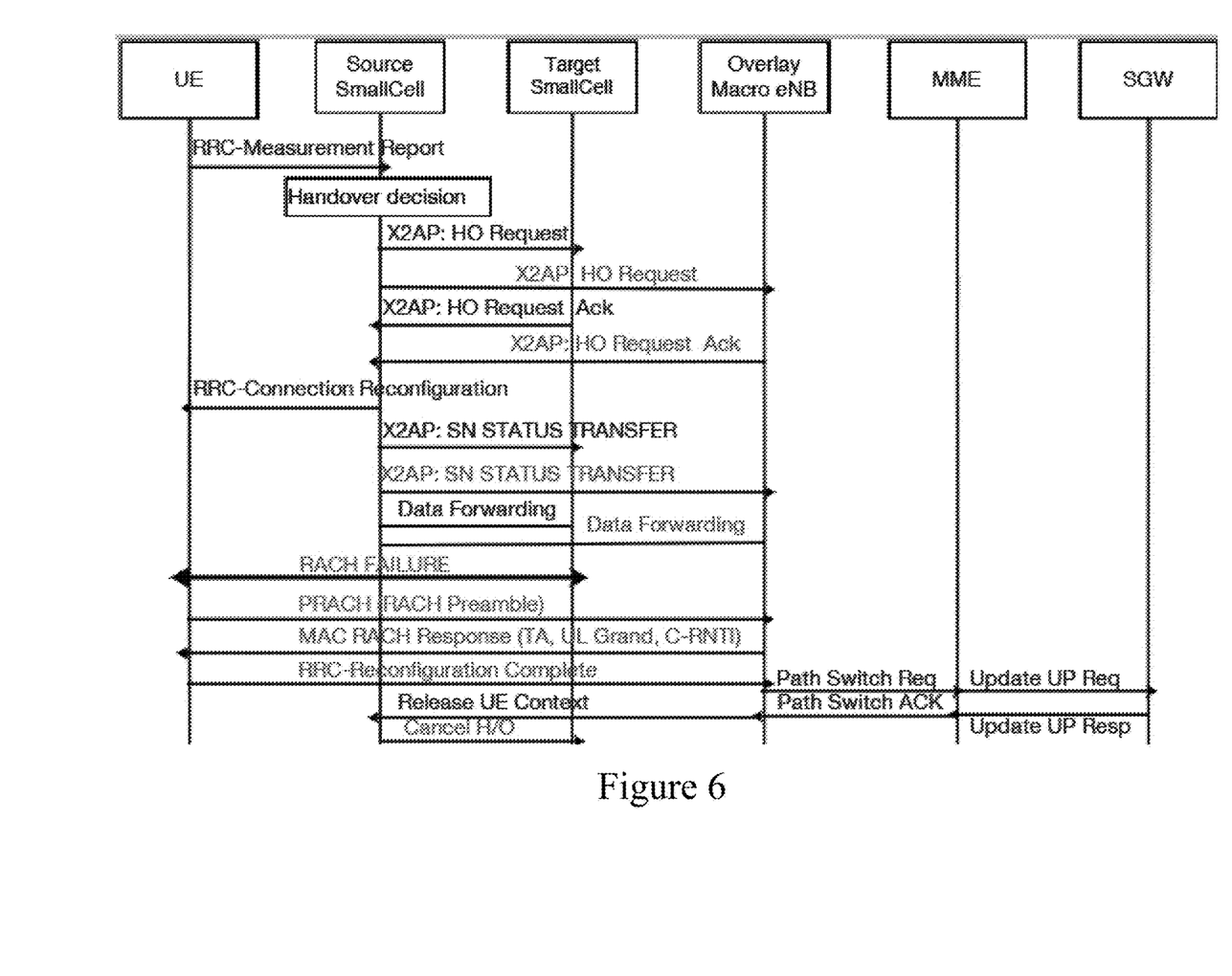
FIG. 6 illustrates an exemplary modified HetNet handover call flow according to certain embodiments.
Figure 7:
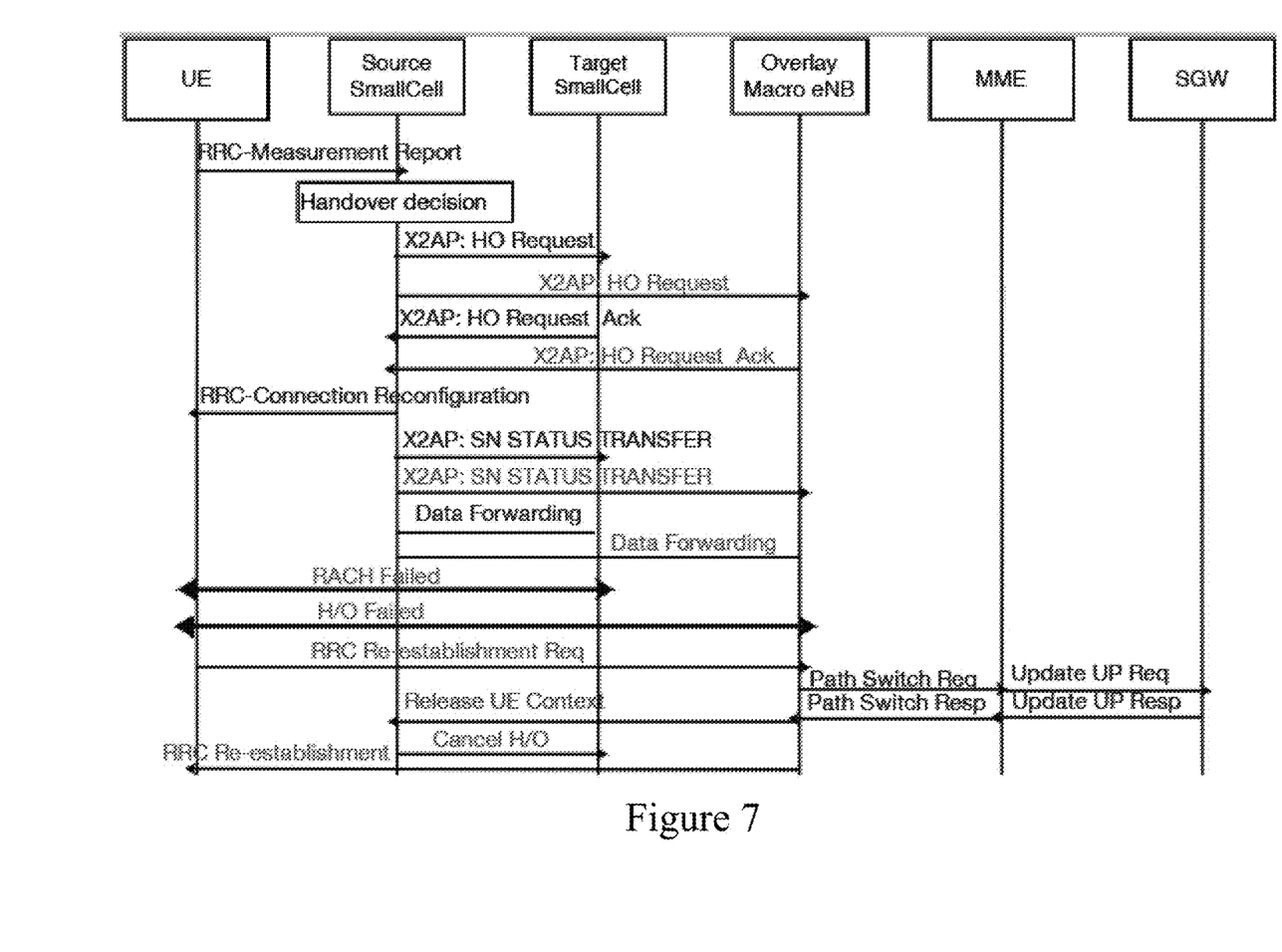
FIG. 7 illustrates an exemplary modified HetNet handover call flow to support radio link failure according to certain embodiments.

Existing LTE X2/S1 based handover mechanisms, which are incorporated herein by reference, can be used to prepare both the macrocell as well as a target small cell. The candidate macrocell can be prepared for infinite duration where the source will have to cancel the preparation if it does not want the UE to associate with the prepared cells, or can include a large timer value (e.g. based on data or speech connection or call duration, for example hours or half an hour after disconnect). FIG. 6 illustrates an exemplary modified HetNet handover call flow according to certain embodiments. FIG. 7 illustrates an exemplary modified HetNet handover call flow to support radio link failure according to certain embodiments.

Certain embodiments of this disclosure can include a method to reduce handoff failures in HetNet deployment by preparing both target small cell and overlay macrocell. The source small cell can proactively prepare both overlay macrocell and target small cell during handover preparation before sending a handover command to a UE. The source small cell can inform the UE, using an RRC message, of the identity of the prepared handover candidates. The UE can first attempt to complete handover procedure with the target small cell. If unable to complete handover, it can fall back to the prepared macrocell. In case of radio link failure, the UE can fall back to the prepared macrocell. As soon as UE is able to successfully perform RRC reestablishment with target macrocell, the macrocell can offload the UE to a nearby small cell using standard procedures.

With increased UE speed or mobility, frequent handovers may occur in a HetNet deployment due to the potential of larger number of small cell sizes. This could lead to handover performance degradation, increased radio link failure (RLF) and RRC re-establishment procedures, and unnecessary handovers or a "Ping-Pong" effect. In certain embodiments, the eNB might consider the mobility or mobility state (as discussed below) of a UE to decide if the eNB needs to prepare a macro eNodeB in additional to small cells to support handover failure and/or RF loss situations.

In LTE, any data transmission requires that the UE be in high power RRC connected state. With all data applications there are often moments when no data is being sent or received and during those moments, using a connected state discontinuous reception (DRX) mode can save energy (i.e., battery life of the UE). Connected state DRX (C-DRX or cDRX) cyclically shuts down and wakes up the UE receiver circuits in order to save energy, with the goal of not adversely affecting the performance of the active data application and/or its ability to effectively communicate with the serving cell.

In certain embodiments, the UE can report to the eNB its mobility state. The UE can determine its mobility state in a myriad of ways. For example, the UE can use on-device motion sensors to determine its mobility state. The UE may also use one or more other aspects to determine its mobility state, such as: relative eNB signal strength, GPS movement, Doppler parameters, and so on. This mobility state can be as simple as high, medium, low, or can provide more detail and granularity. This reporting can be done through a medium access control (MAC) control element (CE) or during a UE measurement report as configured by the eNB through RRC. Also, new, non-standard messaging may be used. Alternatively, the eNB can estimate the UE's mobility state (high, medium . . . ) through RRC.

The eNB can then decide to change the RRC inactivity timer based at least in part on the UE's mobility state (i.e., shorten the timer for higher speed UEs). Typically, the standard timer might be set at 1.28 seconds. This can allow the UE to move quickly to idle state and avoid unnecessary handovers, due to crossing cells, and/or the Ping-Pong effect. The handover (H/O) avoidance can happen because, in the LTE standard, no H/O will occur in idle state (which can instead use cell reselection). The eNB will also have the UE configured with a different set of parameters for shortening the time between RLF to RRC re-establishment. For example, the shortened time might be 100 milliseconds (ms) instead of 300 ms. These parameters can be effective only if the mobility state at the UE has crossed a certain threshold.

In C-DRX, the eNB can have different parameter configurations depending on the UE speed (e.g., or UE mobility state). For example, if a UE is in a high mobility state, then the C-DRX off period can be shortened (e.g., from 320 ms down to 1-16 ms) to allow the UE to make more accurate reference signal received power (RSRP)/reference signal received quality (RSRQ)/radio link monitoring (RLM) measurements (e.g., as defined in LTE standard 36.214, among others, which is fully incorporated herein by reference) but also to be able to discover small cells more frequently.

Figure 8:
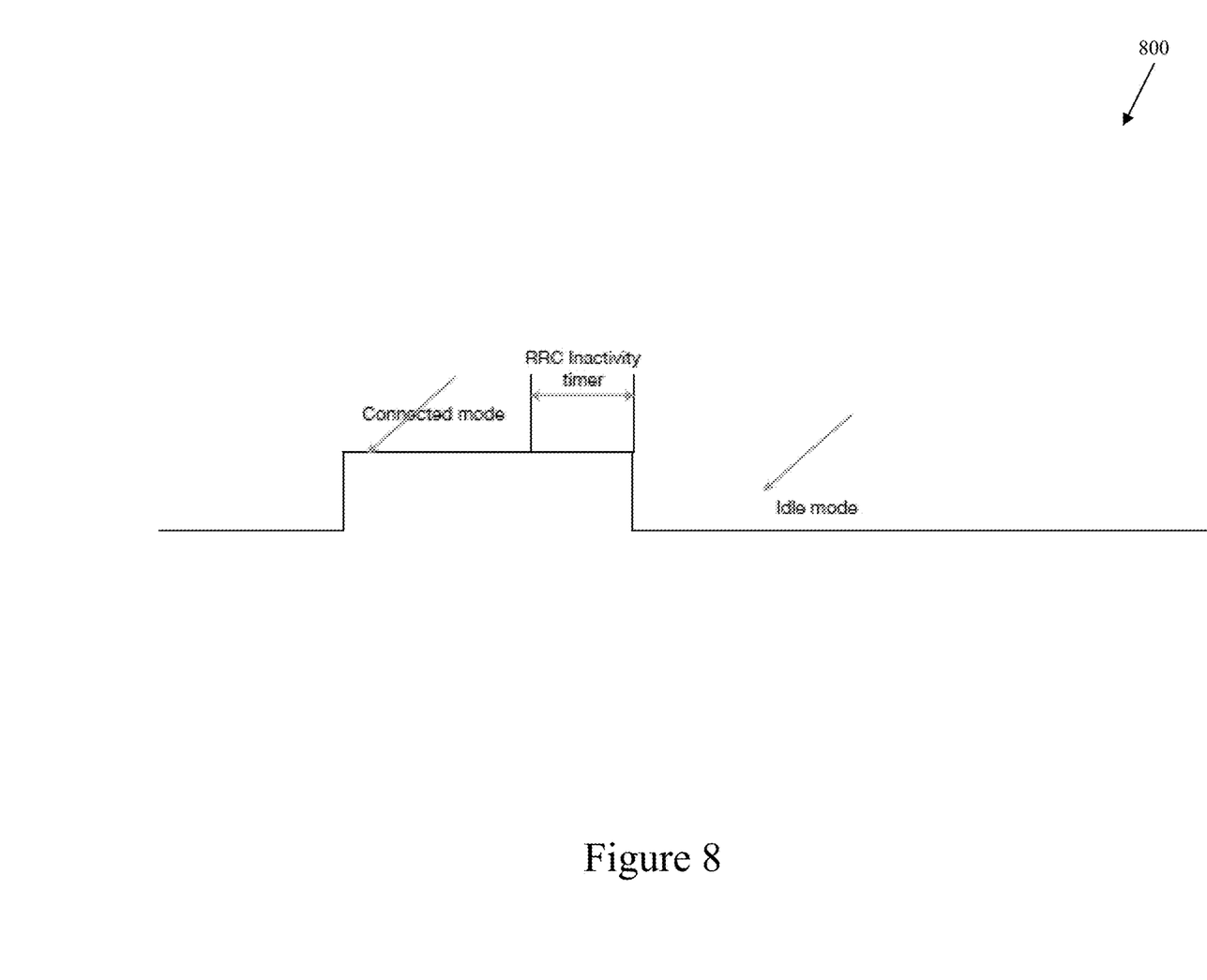
FIG. 8 illustrates an exemplary HetNet handover connected use case according to certain embodiments.

FIG. 8 illustrates an exemplary HetNet handover connected use case 800 according to certain embodiments. In case there is no data transfer between the UE and eNB for a period of time specified by RRC inactivity timer, the UE will move to idle mode. In idle mode, there is no handover, the UE will do a cell re-selection which is less stringent than H/O.

Figure 9:
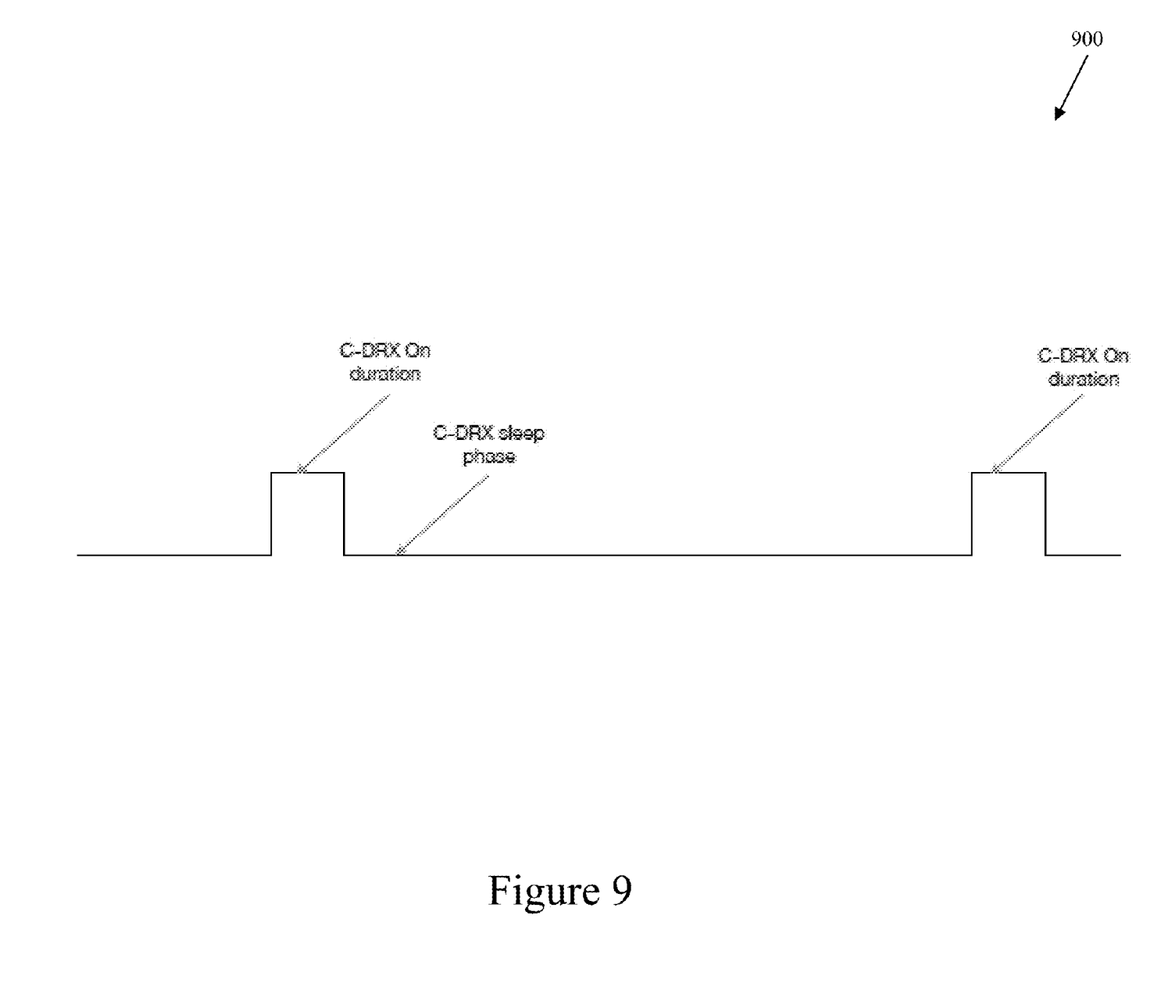
FIG. 9 illustrates an exemplary HetNet handover C-DRX case according to certain embodiments.

FIG. 9 illustrates an exemplary HetNet handover C-DRX case 900 according to certain embodiments. In C-DRX, the UE and eNB can exchange data in the C-DRX on duration and not in the C-DRX sleep phase. If/when the eNB detects that the UE is in a high mobility state, it can change the C-DRX configuration (through RRC reconfiguration) by shortening the C-DRX sleep phase.

Once in idle mode, per the LTE standards, the UE will camp on the strongest cell and every 1.28 seconds, the UE reads pages. Also, periodically, the UE reads cell measurements to determine which cell might be strongest, along with other cell info. According to certain embodiments, the UE can camp on the macrocell during idle mode to avoid multiple cell reselections even if a small cell may have a stronger signal. This means that a mechanism to identify the cell (small vs. macro) is in place. SIB4 and SIB5 biasing information can be used to decide if an eNB is macro or node. The UE also will synchronize with the small cell (i.e., will read primary and secondary synchronization signals (PSS/SSS)/master and system information blocks (MIB/SIB) of the strongest small cell). In this way, the UE can camp on two cells (the macrocell and a small cell). When the UE is paged (i.e., a downlink process), it will first try to answer it in the macrocell (since it is camping on it). If it fails on the macrocell, it will try on the small cell, since it has the information ready, reducing the time needed to establish a connection with the small cell.

If the UE needs to transfer data to the eNB (i.e., an uplink process), the UE can check the amount of data (e.g., the information is available at the buffer status), if the amount of data is small (e.g., SMS, email, etc.), the UE will connect to the macrocell, otherwise, if the amount of data is large (e.g., streaming video, some web browsing, location-based services, etc.) the data can go over the small cell. If the data transfer is for voice, then the UE can connect to the strongest cell, or perhaps, try the macrocell first and then the small cell second.

For UE paging, when in idle mode, the UE can camp on the macrocell. The UE will identify the macrocell by reading the biasing information on SIB4/SIB5. The UE can also read the PSS/SSS/MIB/SIB of the strongest small cell. When a page is received the UE can first try to attach to the macrocell; in case of failure, then the UE will attach to the small cell. The UE can also use its mobility state to help determine when/whether to attach to a prepared small cell versus a prepared macro cell. For example, if the UE determines it is in a high mobility state, it can choose to attach to a macro cell instead of a small cell to help prevent frequent handovers and/or the "Ping-Pong" effect. Likewise, if the UE determines it is in a low mobility state, it can choose the small cell.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. An apparatus comprising:
 one or more processing elements, wherein the one or more processing elements are configured to cause a source cell, comprising the apparatus, to:
  receive, for a mobile device in communication with the source cell, a mobility state of the mobile device;
  based on the mobility state, modify a radio resource control (RRC) inactivity timer for the mobile device;
  send a mobile device configuration, wherein the configuration includes a different set of parameters for the shortened RRC inactivity timer, wherein the different set of parameters include a shortened time between detecting radio link failure (RLF) and attempting an RRC re-establishment procedure;
use an LTE X2 handover mechanism in handover preparation before sending a handover command to the mobile device, wherein an overlay macrocell and a target small cell are prepared for handover of the mobile device during the handover preparation;
send the mobile device the identities of the prepared overlay macrocell and the prepared target small cell using RRC messaging.

2. The apparatus of claim 1, wherein the modified RRC inactivity timer is shortened in response to the mobility state being above a threshold mobility state.

3. The apparatus of claim 1, wherein the mobile device is configured to:
receive the RRC messaging from the source cell;
receive the handover command from the source cell;
attempt to complete handover with the prepared target small cell, and
if the attempt fails, then fall back to complete handover with the prepared overlay macrocell.

4. The apparatus of claim 1, wherein the mobile device is configured to:
receive the RRC messaging from the source cell;
detect a radio link failure;
first attempt to perform RRC reestablishment with the prepared overlay macrocell; and
after reestablishment success, perform handover from the overlay macrocell to a nearby small cell.

5. The apparatus of claim 1, wherein the overlay macrocell is prepared using a large timer value.

6. An apparatus comprising:
one or more processing elements, wherein the one or more processing elements are configured to cause a source cell, comprising the apparatus, to:
determine a mobility state for a mobile device, wherein the mobility state includes at least one lower mobility state and at least one higher mobility state;
determining a shortened radio resource control (RRC) inactivity timer in response to the mobile device being in the at least one higher mobility state; and
sending mobile device configuration, wherein the configuration includes a different set of parameters for the shortened RRC inactivity timer, wherein the different set of parameters include a shortened time between detecting radio link failure (RLF) and attempting an RRC re-establishment procedure.

7. The apparatus of claim 6, wherein the one or more processors are further configured to cause the source cell to:
use an LTE X2 handover mechanism in handover preparation before sending a handover command to the mobile device, wherein an overlay macrocell and a target small cell are prepared for handover of the mobile device during the handover preparation;
send the mobile device the identities of the prepared overlay macrocell and the prepared target small cell using radio resource control (RRC) messaging.

8. The apparatus of claim 6, wherein the mobility state is received from the mobile device.

9. The apparatus of claim 6, wherein the mobility state is received through at least one of a media access control (MAC) control element (CE) and a mobile device measurement report, as configured by the source cell through radio resource control (RRC).

10. The apparatus of claim 6, wherein the mobility state is estimated by the source cell.

11. An apparatus comprising:
one or more processing elements, wherein the one or more processing elements are configured to cause a mobile device, comprising the apparatus, to:
determine a mobility state of the mobile device, wherein the mobility state includes at least one lower mobility state and at least one higher mobility state;
send an indication of the mobility state to a source cell of the mobile device, wherein, in response to receiving the mobility state, the source cell is configured to determine a shortened radio resource control (RRC) inactivity timer in response to the mobile device being in the at least one higher mobility state, wherein when there is no data transfer between the mobile device and the source cell for a period of time specified by the RRC inactivity timer, the mobile device will move to idle mode; and
receive a mobile device configuration from the source cell, wherein the configuration includes a different set of parameters for the shortened RRC inactivity timer, wherein the different set of parameters include a shortened time between detecting radio link failure (RLF) and attempting an RRC re-establishment procedure.

12. The apparatus of claim 11, wherein the one or more processing elements are further configured to:
receive from the source cell a handover command that identifies a prepared overlay macrocell and a prepared target small cell using radio resource control (RRC) messaging.

13. The apparatus of claim 12, wherein the one or more processing elements are further configured to:
first attempt to complete handover with the prepared target small cell; and
when the first attempt fails, complete handover with the prepared overlay macrocell.

14. The apparatus of claim 11, wherein the one or more processing elements are further configured to:
detect a radio link failure;
attempt to perform RRC reestablishment with the prepare overlay macrocell; and
after reestablishment success, perform handover from the overlay macrocell to a nearby small cell.

15. The apparatus of claim 11, wherein sending the indication of the mobility state comprises sending at least one of a media access control (MAC) control element (CE) and a mobile device measurement report, as configured by the source cell through radio resource control (RRC).

16. A method, comprising:
by a source cell:
receiving, for a mobile device in communication with the source cell, a mobility state of the mobile device;
based on the mobility state, modifying a radio resource control (RRC) inactivity timer for the mobile device;
sending a mobile device configuration, wherein the configuration includes a different set of parameters for the shortened RRC inactivity timer, wherein the different set of parameters include a shortened time between detecting radio link failure (RLF) and attempting an RRC re-establishment procedure;
using an LTE X2 handover mechanism in handover preparation before sending a handover command to the mobile device, wherein an overlay macrocell and a target small cell are prepared for handover of the mobile device during the handover preparation; and sending the mobile device the identities of the prepared overlay macrocell and the prepared target small cell using RRC messaging.

17. The method of claim 16, wherein the modified RRC inactivity timer is shortened in response to the mobility state being above a threshold mobility state.

18. The method of claim 16, wherein the overlay macrocell is prepared using a large timer value.

19. The method of claim 16, wherein the overlay macrocell is prepared until cancelled by the source small cell if it does not want the mobile device to associate with the prepared overlay macrocell.

\* \* \* \* \*